Aug. 15, 1939.    L. C. MAHER    2,169,564
VAPORIZED FUEL HEATER FOR GAS ENGINES
Filed May 27, 1936
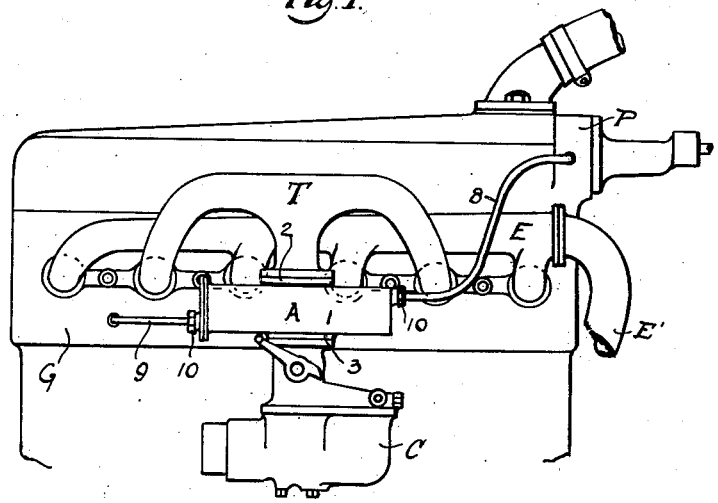
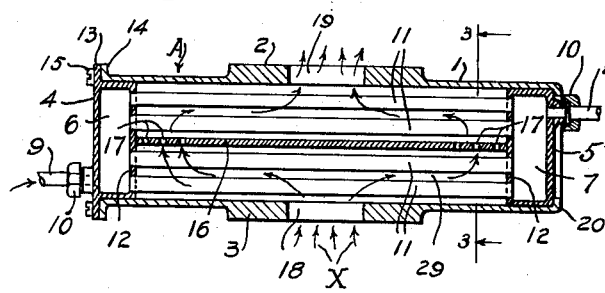
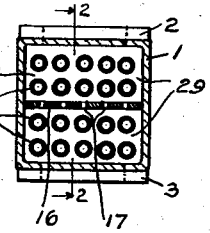
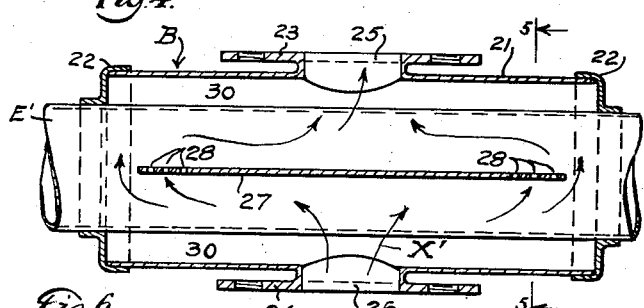
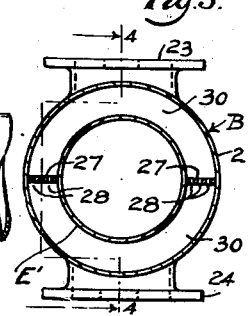
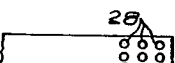
INVENTOR;
Laurence C. Maher;
BY
Harold D. Penney, ATTORNEY.

Patented Aug. 15, 1939

2,169,564

UNITED STATES PATENT OFFICE 2,169,564

VAPORIZED FUEL HEATER FOR GAS ENGINES

Laurence C. Maher, Asbury Park, N. J.

Application May 27, 1936, Serial No. 81,982

2 Claims. (Cl. 257—236)

The present invention relates to a thermal vaporizer for liquid hydrocarbon fuels for gas engines, and it has for its important feature a construction which adapts the device to be fitted to the intake manifold side of an engine, between the carbureter and the carbureter end of the intake manifold, being thus interposable between said members, and, as will hereinafter be ascertained, with no structural changes in said members. In such structure, the device is so constructed that its bore is of the same diameter as the carbureter and intake bores, so that its volume passing capacity will be at least equal to the bores of the intake and carbureter.

A further advantage is in the provision of means for passing either hot water or hot exhaust gases through a segregated section of the device to effectively heat the ingoing fuel vapors before they reach the combustion chamber of the engine, thus acting as a heat transfer and gasifier.

A further feature is in the provision of an elongate, centrally located baffle plate perforated at opposite ends at spaced apart locations, to compel the ingoing vapor to pass over an extended heated area, to completely heat, and convert the cold ingoing fuel vapor into a heated gas, thus to increase the efficiency of the explosive fuel gas and to accomplish economy in gasoline consumption, as tests have shown.

The foregoing and other features of advantage will appear as the herein description proceeds, and it is obvious that modifications may be made in the structure herein without departing from the spirit hereof or the scope of the appended claims.

In the drawing,

Fig. 1 is a view in elevation of a partially fragmented gas engine, of characteristic construction, showing the present device attached thereto in operative position;

Fig. 2 is an enlarged, longitudinal sectional view of the device taken on line 2—2, Fig. 3, looking in the direction of the arrows;

Fig. 3 is a sectional view taken on line 3—3, Fig. 2, looking in the direction of the arrows;

Fig. 4 is an enlarged view of a modified form of device, in longitudinal sectional view, taken on line 4—4, Fig. 5, looking in the direction of the arrows;

Fig. 5 is a transverse sectional view taken on line 5—5, Fig. 4, looking in the direction of the arrows; and Fig. 6 is a fragmented plan view of one of the baffle plates of Figs. 4 and 5.

As in Fig. 1, the hot water fuel heater, generally denoted by A, is interposed between the engine intake pipe T, and the carbureter C, by means of its integral flange seats 2 and 3, which are threadedly connected in operative position, as shown in Fig. 1, by the usual threaded head screws, not shown, but well known in this practice. The threaded screw holes in seats 2 and 3 match those of the intake pipe and carbureter flanges, and thus the affixing of the device to said flanges is simple and convenient.

The housing 1, Fig. 1, has its opposite closed ends provided with couplings 10—10, these in turn connect pipes 8 and 9 from the water jacket G of the gas engine and the pump chamber P so that during the operation of the engine, the pump P will pass water, at engine temperatures, through the inner hot water manifold of the housing 1, as is shown by the arrows at 8 and 9, in Fig. 2. In this latter figure and in Fig. 2 are shown the outer housing 1, both open ends of which are flanged, at one end, turned inwardly, as at 20, and outwardly at the other end, turned outwardly, as at 14, Fig. 3.

At the right hand end, as viewed in Fig. 2, at the in-turned flange there rests a chambered, closed pipe header, 5, which carries the coupling 10, and has, at its opposite face 12, a plurality of pipe bores into which are sealed the ends of a plurality of pipes or ducts 11. The ducts 11 are elongate and at their opposite ends are sealed, with a liquid tight fit, into the wall 12 of a second chambered, closed header 4 which, like header 5 also is closed and water-tight, and which also has a hot water pipe coupling 10, for purposes previously described.

Header 4 has an outstanding peripheral flange 13 which matches with out-turned flange 14 of the housing 1, and by means of head screws 15, the header 5 is joined, in a liquid tight manner to the housing flange 14.

To remove the hot water manifold, from the housing 1, screws 15 and the pipes 8 and 9 are removed and the header can then be removed, from the left, as viewed in Fig. 2 and replaced, by sliding.

The interior space between the headers 4 and 5, is completely blocked across, transversely and longitudinally, Figs. 2 and 3, respectively, by a baffle plate 16. This baffle plate, by suitable means, is supported at the longitudinal center of the housing and thus divides the chamber of the housing 1, and the water tube portion of the manifold, Fig. 3, into two substantially equal sections.

The opposite ends of the baffle plate are provided with a plurality of apertures 17, in sufficient number, in each end group, to at least, at each end group, equal about half the area of the inlet and exit bores 18, 19, which are of equivalent diameter to the bore of the inlet manifold of the gas engine. In actual practice, to prevent wire drawing of the gas charge and consequent back pressure on the engine pistons, the combined areas of the end-group apertures may be a little greater than that of the manifold.

As thus constructed and described, when the heat transfer device of Figs. 2 and 3 is operatively connected to the water jacket, as in Fig. 1, operation of the engine volatilizes the gasoline with air, which fuel is then drawn upwardly in the direction of the arrows X through inlet area 18, and the pipe interstices 29, the baffle diverts the inflowing fuel vapor to the end-group apertures, thus causing the fuel vapor to travel along the heated pipe manifold in a split stream, the divergence thereof being about of even volume. As the partially heated vapor passes through the apertures 17, it is then converged towards the outlet bore 19, causing the already heated vapors to be passed along the second group of heated pipes and be subjected to a second heating, the vapor by this time being well heated and in gasified condition, thus improving it as a fuel.

Due to the connections 8—9 of the device, heated water is constantly supplied thereto, thus maintaining a constant temperature therein, once the engine becomes normally heated.

It will be noted that this device lengthens the path of travel of the fuel gas as it passes from the carbureter to the engine, and due to its relative horizontal, operative position, as in Fig. 1 the carbureter is displaced only a short distance away from its original operative position.

In the second form, shown in Figs. 4 and 5, this form shows the adaption of the exchanger-heater constructed to be heated by the exhaust gases of the engine. To this end, by connecting an auxiliary shunt pipe E′ between two spaced sections of an exhaust manifold E, Fig. 1, in any suitable manner, some of the exhaust gases circulate through pipe E′, during the running of the engine.

As in Figs. 4 and 5, the pipe E′ where it crosses the engine intake manifold, is provided with a cylindrical housing B, said housing being provided with coaxial bores 25 and 26 forming outlet and inlet passages respectively. These bores are provided with flanged extensions with, threaded flanges 23 and 24. These threaded flanges match and register their threaded holes with the flanges and thread or bolt holes of the carbureter and intake manifold flanges, the operative assembly of the device of Figs. 4 and 5 to the carbureter and intake manifold being substantially the same as shown and described for the device of Fig. 1.

The housing B, Fig. 4, is provided with headers 22, one at each end thereof, these headers comprising centrally bored flanges which snugly fit the heater pipe E in a gas tight fit. The perimeter of the headers are circumferentially flanged and fitted snugly to the outer surface of the ends of the housing E′, in a gas tight manner.

In the circumferential space 30 between the axially alined housing and heater pipe E′, Fig. 5, are located two blocking baffle plates 27—27, and, as viewed in Fig. 5 are spaced 180 degrees apart, and preferably across the mid section. As these plates 27 are snugly fitted and fastened between the inner surface of casing 21 by suitable means, or structure, the chamber between the casing 21 and the heater pipe is divided into two separated compartments, which communicate with each other at the opposite ends of the baffle plates, which ends do not touch the walls of the headers 22, and which baffle ends are also provided with perforations 28—28, Figs. 5 and 6.

While the results of the action of this latter device are similar to that of the device of Figs. 1 to 3, the result is accomplished by a somewhat different action. As the carbureted vapor flows through inlet 26 it strikes the baffles 27—27 and also the heating surface of heater pipe E′. It is then forced to flow in the direction of the arrows shown below the baffle in Fig. 4. Some of the vapor passes upwardly through the apertures 28—28 on both ends, and some of the vapor passes around the ends of the baffles, with the result that the vapor from the apertures and that passing around the ends intermix with great violence as they pass along the upper surface of the pipe E′, so that the heated vapors are thoroughly mixed and gasified by the time they reach the outlet 25.

Both of the herein shown devices are efficient, give greater mileage per gallon of liquid fuel, may be used to volatilize heavier fuels than gasoline, once the motor heat is established, and they prevent dangerous back-firing through the carbureter, because the structure thereof, including the perforated baffles, act on the principle of Davey's screened miner's lamp. This latter feature is of great value, because it eliminates one great source of fire hazard on motor vehicles.

The devices shown, especially that of Fig. 1 are easily installed upon engines already in use, or they may be inbuilt as part of the engine structure.

Having thus described the invention what is claimed is:

1. A fuel heat-exchanger comprising in combination a chambered housing having a plurality of parallel ducts therein for conducting a heated fluid therethrough, inlet and outlet ports in said housing for conducting a stream of vaporized fuel therethrough in contact with said ducts, a flow directing baffle located in said chamber parallel to said ducts to redirect the ingoing fuel from said inlet to said outlet and spaced perforations at opposite ends of said baffle.

2. A fuel heat-exchanger comprising, in combination, a chambered housing having a duct means therein for conducting a heated fluid therethrough, inlet and outlet ports in said housing for conducting a stream of vaporized fuel therethrough in contact with said duct means, a flow directing baffle means located in said chamber to redirect the ingoing fuel from said inlet to said outlet across said duct means and spaced openings at opposite ends of said baffle, the combined areas of said openings being at least equal to or of greater composite area than the areas of said inlet or outlet.

LAURENCE C. MAHER.